REGULATED POWER SUPPLY WITH FEEDBACK MEANS

Original Filed Sept. 20, 1962 2 Sheets-Sheet 1

INVENTOR.
MILTON W. MATHIAS
BY Roger W. Jensen
ATTORNEY

REGULATED POWER SUPPLY WITH FEEDBACK MEANS

Original Filed Sept. 20, 1962 2 Sheets-Sheet 2

INVENTOR.
MILTON W. MATHIAS
BY Roger W. Jensen
ATTORNEY

United States Patent Office

Re. 26,277
Reissued Oct. 3, 1967

26,277
REGULATED POWER SUPPLY WITH FEEDBACK MEANS

Milton W. Mathias, Minneapolis, Minn., assignor to Honeywell Inc., a corporation of Delaware Original No. 3,230,441, dated Jan. 18, 1966, Ser. No. 225,080, Sept. 20, 1962. Application for reissue Aug. 1, 1966, Ser. No. 574,264
9 Claims. (Cl. 321—52)

Matter enclosed in heavy brackets [ ] appears in the original patent but forms no part of this reissue specification; matter printed in italics indicates the additions made by reissue.

*ABSTRACT OF THE DISCLOSURE*

*A circuit for phase splitting and amplifying an input signal and combining the amplified signal to provide three phase output power. Additionally, there is disclosed means for amplitude regulating two phases of the three phase signal and regulating the phase between these two signals so as to effectively regulate the amplitude of all three phases of the power output.*

Generally this invention pertains to power supplies and more particularly it pertains to a novel method of supplying feedback for providing a high accuracy and well regulated power supply.

Many types of power supplies have been designed as may be observed by the great amount of prior art. However, where the circuits have been kept fairly simple the regulation has not been particularly good. Where firmly good accuracy has been obtained the circuits are quite complex and costly to build. This invention uses very standard components and still obtains high accuracy in regulation of the output voltage while utilizing a minimum of parts. This provides a well regulated power supply at a comparatively low cost.

It is an object of this invention to provide a novel means of feedback for controlling the amplitude of the output signal in a device.

Another object is to provide a novel structure for obtaining the proper phase relations between three phases of a power supply.

Further objects of this invention will become apparent upon reading the specification in conjunction with the appended claims and the drawings in which:

Figure 1:
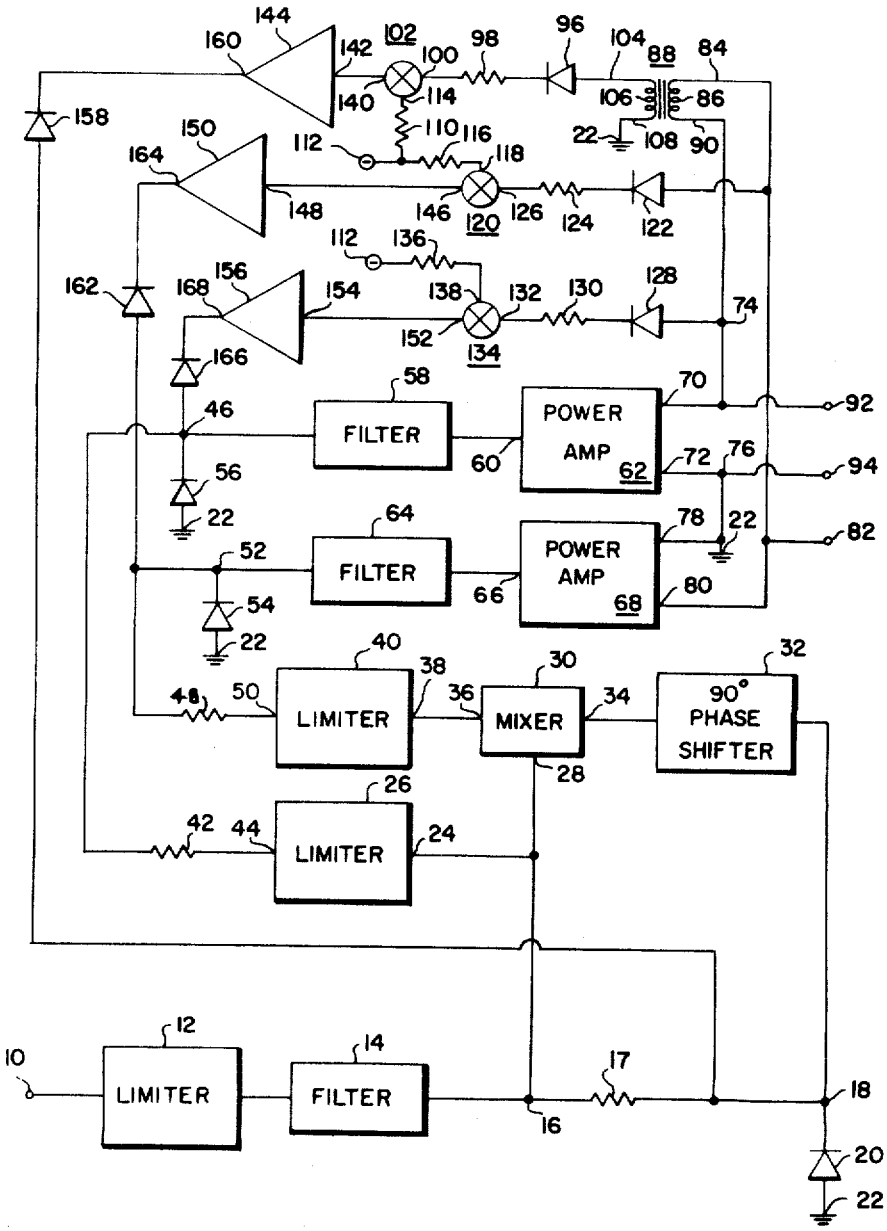
FIGURE 1 is a block diagram of a three phases power supply utilizing the novel means of feedback.

In FIGURE 1 an input 10 is connected to supply signals to a constant amplitude control means, isolating means, input signal supplying means, or limiter means 12. The limiter 12 may be a set of diodes or two sets of diodes isolated by an amplifying stage to provide a constant amplitude square wave output. If the supply signal is a square wave or if extreme accuracy in the output is not needed, the limiter 12 is not required. Limiter 12 supplies a signal to an input of a filter 14. The filter 14 may be similar to a filter obtained from White Instrument Lab No. BP2—G. This is a bandpass type filter but any other suitable filter, such as a low-pass filter, may be used. An output of filter 14 is connected to a junction point 16. A resistance or impedance means 17 is connected between the junction point 16 and a junction point 18. A shunt means, clipping means, diode means, regulating means, or voltage sensitive control means 20 is connected between the junction point

18 and ground or reference potential means 22. All later references to diode means in this specification and appended claims are intended to include the above names and corresponding scope thereof. The diode means 20 is connected to provide a direction of easy current flow from ground 22 to junction point 18. The junction point 16 is also connected to an input 24 of a limiter or isolating means 26 and to an input 28 of a mixer 30. The limiter 26 may be of the same type as limiter 12. A phase shifting means 32 which in this embodiment is phase shifting the signal 90° is connected between the junction point 18 and an input 34 of the mixer 30. An output 36 of mixer 30 is connected to an input 38 of a limiter or isolating means 40. Limiter 40 may be the same as limiter 12 or 26. A resistance means or impedance means 42 is connected between an output 44 of limiter 26 and a junction point 46. A resistance means or impedance means 48 is connected between an output 50 of limiter 40 and a junction point 52. A diode means 54 is connected between the junction point 52 and ground 22 with a direction of easy current flow from ground 22 to junction point 52. A diode means 56 is connected between the junction point 46 and ground 22 in a manner to permit easy current flow in a direction from ground 22 to junction point 46. A filter means 58 is connected between the junction point 46 and an input 60 of an isolation means or power amplifier means generally designated as 62. A filter means 64 is connected between the junction point 52 and an input 66 of a power amplifier means or isolation means generally designated as 68. The filters 58 and 64 may be similar to filter 14. The power amplifiers 62 and 68 in one application of the invention were ordinary McIntosh high fidelity power amplifiers. The power amplifier 62 has first and second outputs 70 and 72 respectively connected to junction points 74 and 76 respectively. The power amplifier 68 has outputs 78 and 80. The output 78 of power amplifier 68 is connected to junction point 76 and ground 22. The output 80 of power amplifier 68 is connected to an output terminal 82 of the power supply and to one end 84 of a primary winding 86 of a transformer 88. The other end 90 of primary winding 86 is connected to the junction point 74. The output 70 of power amplifier 62 is connected to an output 92 of the power supply while the output 72 of power amplifier 62 is connected to a third output 94 of the power supply. A diode means 96 is connected in series with a resistance or impedance means 98 between an input 100 of a summing means 102 and one end 104 of a secondary winding 106 of transformer 88. The other end 108 of secondary winding 106 on the transformer 88 is connected to ground 22. A resistance or impedance means 110 is connected between a bias signal means or reference voltage means 112 and an input 114 of summing means 102. A resistance means or impedance means 116 is connected between the bias means 112 and an input 118 of a summing means generally designated as 120. A diode means 122 is connected in series with a resistance or impedance means 124 between output 82 and an input 126 of summing means 120. Diode means 122 is situated for easy current flow from output 82 to the input 126. A diode means 128 is connected in series with a resistance or impedance means 130 between junction point 74 and an input 132 of a summing means generally designated as 134. A resistance or impedance means 136 is connected between the bias means 112 and an input 138 of summing means 134. An output 140 of summing means 102 is connected to an input 142 of an amplfier means generally designated as 144. An output 146 of summing means 120 is connected to an input 148 of an amplifier means generally designated as 150. An output 152 of summing means 134 is connected to an input 154 of an amplifier means generally designated as 156. The amplifiers 144, 150 and 156 may be of a type designated as USA–3 and produced by George Philbrick Researchers, Inc. Also, these amplifiers may incorporate the summing means shown connected to their inputs as part of the amplifier to provide what is commonly known as a summming amplifier means. A diode means 158 is connected between an output 160 of amplifier 144 and junction point 18 such that the direction of easy current flow is from junction point 18 to output 160. A diode means 162 is connected between junction point 52 and an output 164 of amplifier 150 in a manner to allow easy current flow from junction point 52 to the output 164. A diode means 166 is connected between the junction point 46 and outpoint 168 of the amplifier 156 in a manner to allow a direction of easy current flow from junction point 46 to output 168.

Figure 2:
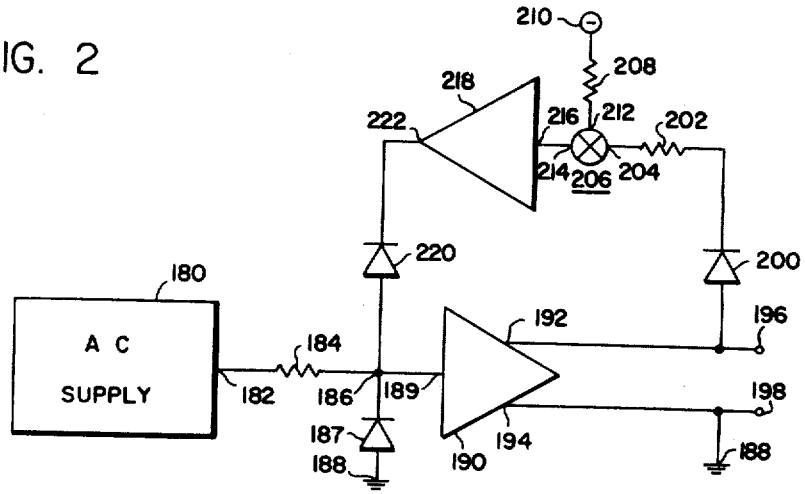
FIGURE 2 is a block circuit diagram showing the use of the invention in a single phase supply.

In FIGURE 2 an alternating signal supply 180 has an output 182. A resistance means or impedance means 184 is connected between the output 182 and a junction point 186. A diode means 187 is connected between the junction point 186 and ground 188. As noted in the above paragraph for FIGURE 1, the various diodes have been designated by several different terminologies and any future use of the word diode means is intended to include all of the various names for such devices.

The junction point 186 is connected to an input 189 of a power amplifier 190. The power amplifier 190 has outputs 192 and 194 connected to junction points 196 and 198 respectively. These junction points also are output terminals for the power supply. Junction point 198 is further connected to ground 188. A diode means 200 is connected in series with a resistance or impedance means 202 between junction point 196 and an input 204 of a summing means generally designated as 206. The diode means 200 is connected to allow a direction of easy current flow from junction point 196 to input 204. The diode means 200 in this instance is for the purpose of rectifying and may be considered in combination with resistance 202 as a rectifying means. A resistance or impedance means 208 is connected between a bias signal means of reference voltage means 210 and an input 212 of the summing means 206. An output 214 of the summing means 206 is connected to an input 216 of an amplifier means 218. The amplifier 218 may be similar to that shown as 144 in FIGURE 1. A diode means 220 is connected between an output 222 of amplifier 218 and the junction point 186 in a manner to provide a direction of easy current flow from junction point 186 to output 222.

Figure 3:
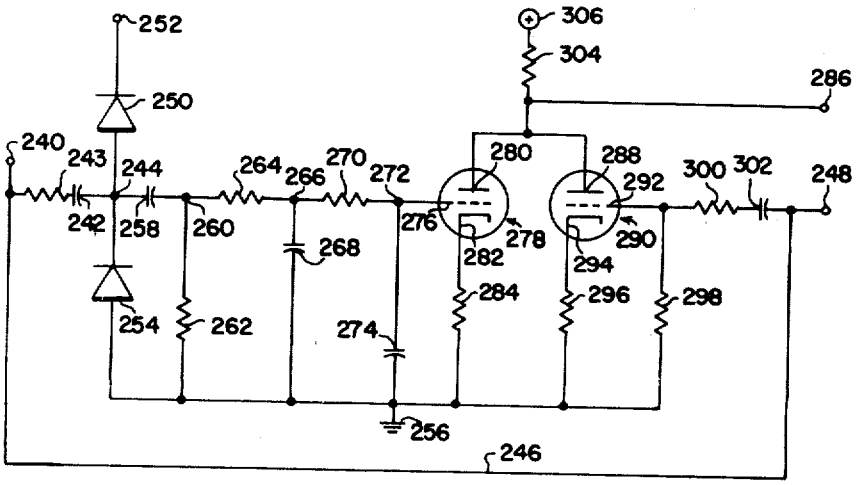
FIGURE 3 is a circuit diagram of the phase shifter and mixer portion of FIGURE 1.

In FIGURE 3 a capacitive means 242 is connected in series with a resistance means 243 between an input terminal 240 and a junction point 244. A lead 246 is connected between the input 240 and an output 248. A diode means 250 is connected between the junction point 244 and another input, terminal means, or control means 252. The diode means 250 is connected in a manner to provide a direction of easy current flow from junction point 244 to input means 252. A diode means 254 is connected between the junction point 244 and ground or reference potential means 256. The diode means 254 is connected in a manner to provide easy current flow from ground 256 to junction point 244. A capacitive means or impedance element 258 is connected between the junction point 244 and a junction point 260. A resistance means or impedance element 262 is connected between the junction point 260 and ground 256. A resistance means or impedance means 264 is connected between the junction point 260 and a junction point 266. A capacitive means or impedance element 268 is connected between the junction point 266 and ground 256. A resistance means or impedance element 270 is connected between the junction point 266 and a junction point 272. A capacitive means or impedance element 274 is connected between the junction point 272 and ground 256. The junction point 272 is also connected to a grid or control element 276 of an amplifying means, valve means, or tube generally designated as 278. The tube 278 has an anode 280 and a cathode 282. A resistance element or impedance means 284 is connected between the cathode 282 and ground 256. The anode 280 is connected to an output 286 and an anode 288 of a valve means, amplifying means, or tube, generally designated as 290 having a control element or grid 292 and a cathode means 294. An impedance means or resistance element 296 is connected between the cathode 294 and ground 256. A further impedance element or resistance means 298 is connected between the grid 292 and ground 256. An impedance means or resistance element 300 is connected in series with a capacitive means or impedance element 302 between the grid 292 and the output means 248. An impedance means or resistance means 304 is connected between the output 286 and a positive power terminal means 306.

OPERATION

Referring first to FIGURE 2, it will be noted that an alternating signal generated from the supply 180, as it attempts to go in a negative direction, will be clipped at a voltage determined by the forward breakdown voltage of diode means [180] *187*. In other words, if current flows through diode means [188] *187* when a voltage of approximately 0.8 volt is applied across it, this will be its breakdown voltage and a negative going signal will be clipped at approximately 0.8 volt. This clipped signal is applied to amplifier 190. As the signal from the supply 180 goes in a positive direction there will be a point at which diode 220 conducts and clips this signal. The point at which diode 220 conducts depends on both its breakdown voltage of approximately 0.8 volt and the output voltage appearing at 222 of amplifier 218. It may be assumed that the output of amplifier 218 is three volts, the positive going signal from supply 180 will clip at approximately 3.8 volts such that the input to amplifier 190 will be a 4.6 volt P—P signal. Since no filters are shown in this basic embodiment, the output signal appearing at terminals 196 and 198 will be a square wave signal. This signal is rectified through diode 200 and applied to the summing means 206. It will be realized that this circuit does not filter the rectified signal but that such a filter can be readily added. In the summing means this signal is compared with a reference voltage obtained from the bias means 210. If the signal obtained from the output of amplifier 190 is the same as the bias means 210 there will be not output from 206 and therefore no output from amplifier 218. This means that the output of amplifier 218 would be a ground potential and a signal of only 1.6 volts P—P will be applied to the amplifier 190 (assuming diode breakdown of 0.8 volt). As long as the circuit is in operation, the signal being applied from the output of amplifier 190 through the rectifying means to summing means 206 will be at a slightly different value than the voltage obtained from bias means 210 such that the output of amplifier 218 is held at some voltage such as the previously mentioned 3 volts. As may be determined, if the bias voltage applied to terminal 210 is varied, the amplitude of the signal appearing at output terminals 196 and 198 will vary accordingly. Since the amplitude of the output signal is dependent upon the bias voltage it may be determined that this thereby provides a simple method of varying the output signal in amplitude. Also, this type circuit may be used where other devices than power supplies need a varying alternating output signal in accordance with a varying direct current input signal. It is within the scope of this invention that the signal obtained from the output of amplifier 190 be summed with an alternating signal from a bias means such as 210 before it is rectified to change the potential across the diode means 220. It is also within the scope of the invention that the output of amplifier 190 be compared with a reference signal without being rectified or amplified in the feedback circuit. Two or more of the systems such as shown in FIGURE 2 may be tied together in a manner to be described in FIGURE 1 to provide a three phase or multiphase power supply.

Turning now to FIGURE 1, an input signal being applied at terminal 10 is limited to a constant amplitude in limiter 12 and then filtered through filter 14 to provide a constant amplitude sine wave signal at junction point 16. If the oscillator or other source of supply provides nearly constant output signals, the boxes 12 and 14 are not required. The signal at junction point 16 is applied to limiter 26 which again limits the signal to a desired amplitude and then is applied to the junction point 46 between the diode means 56 and 166. The output signal from limiter 26 is greater than the breakdown voltages of the diodes 56 and 166. After being controlled in amplitude by the aforementioned diodes, the signal is applied to filter 58 to again produce a sine wave which is applied to and amplified by the power amplifier 62. The signal from power amplifier 62 is picked off by diode means 128, rectified, and applied to the summing means 134 where it is summed with the bias voltage from terminal 112. An output is thus applied to amplifier 156 to thereby control the point at which forward conduction through diode 166 takes place. As will be noted, the diodes 56 and 166 in conjunction with the power amplifier 62, the diode means 128, resistance means 130 in combination with the summing means 134 and the amplifier 156 provides a system very similar to that shown in FIGURE 2. The output signal appearing between terminals 70 and 72 of amplifier 62 are controlled in accordance with the bias signal to provide a stable output.

The signal which was previously mentioned as being applied to junction point 16 is also applied to another set of diodes 20 and 158. This pair of diode means is used to control the phase angle between the output signals appearing from power amplifiers 62 and 68. The method of this control will be described later. After being controlled in amplitude by diode means 20 and 158, the signal is applied to a 90° phase shifter 32 and from there to a mixer 30. If two out-of-phase signals are applied to a mixer, the output signal will be a resultant or composite signal. If the two input signals are 180° out of phase and of the same amplitude, the output will be zero. If the input signals are completely in phase, the output signal will be of twice the amplitude of two identical amplitude input signals. For various amount of [our] *out*-of-phase or different amplitudes the output signal will vary accordingly. It may be assumed that the input signal being applied at input 34 is 90° out of phase with and of approximately twice the amplitude of the signal being applied at input 28. The output signal will then be phase shifted approximately −60° with respect to the signal being applied at input 28. When this signal is applied through an amplifier which shifts the phase 180° the output signal from the amplifier will then be 180°−60° phase shifted from the input signal being applied at input 28. If the mixer 30 is designed with this in mind, it can be designed such that the output of the mixer is already phase shifted 180° within the mixer to thereby produce an output signal which is phase shifted +120° with respect to the input applied at 28 when a 90° phase shifted signal is applied at the other input 34.

The output from mixer 30 is applied to limiter 40 to again limit the signal to a fairly constant amplitude and this is applied to the junction point 52 between diodes 54 and 162 such that the amplitude is controlled in a manner similar to that described for FIGURE 2. This signal is applied to filter 64, to amplifier 68 and an output appears at outputs 78 and 80. The output appearing at output 80 is rectified through diode means 122 and summed and compared in summing means 120. The output from summing means 120 is applied to the amplifier 150 to control the breakdown voltage of diode means 162 and thereby the amplitude of the second phase of the three phase system being described.

If a signal is now taken from terminals 92 and 82, this signal constitutes the third phase. Although there is no third phase being produced directly in this invention, the third phase is determined by the amplitude and phase of the two signals which are being amplified. Since, as previously shown, the amplitude of the other two phases is being controlled to constant values, the amplitude of the signal appearing between terminals 82 and 92 is determinative of the phase difference between the first and second signals. Therefore, the phase difference may be controlled by sensing the amplitude of the signal which would appear between terminals 82 and 92 and thereby use this signal to control the phase of the two signals being applied to power amplifiers 62 and 68. This third phase is applied to a transformer 88 used for isolation and summing. The signal is rectified through diode means 96 and filtered slightly through resistor 98 and applied to summing means 102. Here the third phase is compared with the reference voltage 112 and the difference is applied to amplifier 144 to control the breakdown of diode means 158. The signal being applied to phase shifter 32 and thus to mixer 30 is controlled in amplitude by this third loop which controls the amplitude of the signal allowed to pass from junction point 16 to the phase shifter 32. The amplitude of this signal to phase shifter 32 determines the phase of the output signal from mixer 30.

In summary, a signal is applied to the limiter 26, then through the control diodes 56 and 166 and to the power amplifier 62 to provide a first phase which is controlled in amplitude. A second signal is obtained from the mixer 30, is applied to the control diode means 54 and 162 and to the power amplifier 68 to produce a second phase. The phases of the signals from power amplifiers 62 and 68 are controlled by sensing the amplitude of the signal produced by connecting across their outputs and applying this signal back through amplifier 144 to control the amplitude of the signal allowed to pass between diodes means 20 and 158 to the phase shifting means 32 and thus to mixer 30. This third control loop thereby controls the phase of the signals being applied to the two power amplifiers.

FIGURE 3 is a circuit wherein the diode means 20 and 158 of FIGURE 1 are shown as diode means 254 and 250 respectively. A signal applied to input 240 is applied to the junction point 244 and thereby controlled in amplitude by the diodes 250 and 254. It is then applied to the phase shifting means which comprises the adjacent resistors and capacitors to ultimately be applied to grid 276 of tube 278 which is part of the mixer. The input signal being applied to terminal 240 is also applied to grid 292 through the capacitor 302 and resistor 300. Terminal 248 is the same as input 24 of limiter 26 in FIGURE 1. The capacitor 242 is not shown in FIGURE 1 but the resistor 243 is shown as resistance means 17. It can be seen that the signal applied to tube 290 is of a nearly constant amplitude and is a function of the signal applied to the input. The signal applied to grid 276 of tube 278 is controlled in amplitude by the diode means 250 and 254. The signals applied at grids 276 and 292 will be inverted 180° through the tubes 278 and 290 respectively and summed at output 286 to provide a composite signal. This signal, when taken with respect to the input signal at input 240, will be 120° out of phase when the phase shifter shifts the phase 90° and when the amplitude of the input signal applied to tube 278 is approximately twice the amplitude of the signal which is being applied to control grid 292 of tube 290. In other words, the output appearing at 286 depends on the input signal applied at grid 276 and may theoretically vary from 90° to 180°. Actually in one embodiment of the invention, the signal being passed by the diode means 250 and 254 never got less than the forward conduction voltage of the diodes, and therefore the output signal was never phase shifted as much as 180°.

It must be realized that other types of phase shifters and mixers may be used other than that shown as FIGURE 3 and that this is merely an illustrative embodiment. Likewise, it will be realized that the claims are not intended to be limited to amplifying means such as the [tube] *type* shown but may include transistors or any other type of means for providing amplification. Further, the diode means have been illustrated in the typical semiconductor fashion but the specification and claims are intended to include any other type of clipping means which will perform the same function.

*As previously mentioned, ordinary McIntosh high fidelity power amplifiers were used for blocks 62 and 68. The rest of the control circuitry is therefore useful as a separate item of commerce with any amplifying means capable of amplifying signals of two separate phases between input and output means thereof.*

While two amplifiers, such as 190 and 218, have been shown in each control loop, only one of the two is required to practice the invention. Also the reference signal need not be direct voltage but may be an alternating signal. This A.C. signal when compared with the output can give an appropriate signal to control the conduction periods of diode means 220. Further although two diodes have been shown, the term diode means is intended to include unitary terms such as a field effect transistor which it is believed may be substituted using proper design techniques.

The power sources for the individual boxes have not been shown but may be supplied by those skilled in the art. The terminal 94 has been shown grounded because of the particular requirements of one use of this invention. However, this ground connection may be removed from this point and connected to the center of a three-phase Y load.

It will be further understood that various changes in the details, steps and arrangement of parts which have been herein described and illustrated in order to explain the nature of the invention may be made by those skilled in the art within the principle and scope of the invention and as expressed in the appended claims while staying within the scope of the nivention.

What is claimed is:

1. Plural phase supply apparatus comprising, in combination:

means for supplying a constant amplitude alternating input signal;

first and second diode means each having first and second terminal means, said diode means being connected in series and having a junction means therebetween, said junction means comprising said first terminal means of each of said first and second diode means;

reference potential means;

means connecting said second terminal means of said first diode means to said reference potential means;

first amplitude limiting means including input and output means, adapted for providing a constant amplitude output signal;

mixing means including input and output means, said mixing means being adapted for providing a composite output signal from a plurality of input signals;

phase shifting means, including input and output means, having said output means connected to said input means of said mixing means;

means connecting said alternating input signal supplying means for supplying signals to said junciton means of said first and second diode means, to said input means of said first limiting means, to said mixing means and to said phase shifting means;

first power amplifier means including input means and first and second output means, said first power amplifier means being connected to receive said output signal from said first limiting means and adapted for providing an output signal;

second limiting means including input and output means, said second limiting means being connected to receive said output signal from said mixing means and adapted for providing a constant amplitude output signal;

third and fourth diode means each including first and second terminal means, said first terminal means of said fourth diode means and said first terminal means of said third diode means being connected together and to said output means of said first limiter means for the purpose of modifying the amplitude of the signal being applied to said first power amplifier means, and said second terminal means of said third diode means being connected to said reference potential means;

second power amplifier means including input means and first and second output means, said second power amplifier means being connected to receive said output signal from said second limiting means and adapted for providing an output signal;

fifth and sixth diode means each including first and second terminal means, said first terminal means of said sixth diode means and said first terminal means of said fifth diode means being connected together and to said output means of said second limiter means for the purpose of modifying the amplitude of the signal being applied to said second power amplifier means, and said second terminal means of said fifth diode means being connected to said reference potential means;

means connecting said first output means of said first and second power amplifier means to said reference potential means;

bias means;

first summing amplifier means, including input and output means, said first summing amplifier means being connected to receive said signal from said second terminal means of said first power amplifier means, connected to receive a signal from said bias means, adapted for providing an output signal indicative of any difference in amplitude of the input signals and connected to said second terminal means of said fourth diode means to control the amplitude of the signal being received by said first power amplifier means;

second summing amplifier means including input and output means, said second summing amplifier means being connected to receive said signal from said second terminal means of said second power amplifier means, connected to receive a signal from said bias means, adapted for providing an output signal indicative of any difference in amplitude of the input signals, and connected to said second terminal means of said sixth diode means to control the amplitude of the signal being received by said second power amplifier means;

and third summing amplifier means including input and output means, said third summing amplifier means being connected to receive said signals from across said second terminal means of said first and second power amplifier means, connected to receive a signal from said bias means, adapted for providing an output signal indicative of any difference in amplitude of the input signals, and connected to said second terminal means of said second diode means to control the amplitude of the signal being received by said phase shifting means.

2. Plural phase supply apparatus comprising, in combination:

means for supplying an alternating input signal;

first clipping means including input, output, and control means;

first isolating means including input and output means;

mixing means including input and output means, said mixing means being adapted for providing a composite output signal from a plurality of input signals;

phase shifting means, including input and output means, having said output means connected to said input means of said mixing means, said input means of said phase shifting means being connected to said output means of said first clipping means;

means connecting said alternating input signal supplying means to said input means of said first clipping means, to said input means of said first isolating means, and to said mixing means;

second isolating means including input means and first and second output means;

second clipping means including input, output and control means, said input means being connected for receiving a signal from said first isolating means and said output means being connected for supplying a controlled output signal to said input means of said second isolating means;

third isolating means including input means and first and second output means;

third clipping means including input, output, and control means, said input means being connected for receiving a signal from said mixing means and said output means being connected for supplying a controlled output signal to said input means of said third isolating means;

means connecting the first output means of said second and third isolating means together;

bias signal means;

first summing means, including input and output means, said first summing means being connected for receiving a signal from siad second output means of said second isolating means, connected for receiving a signal from said bias signal means, adapted for providing an output signal indicative of any difference in amplitude of the input signals, and connected to said control means of said second clipping means to control the amplitude of the signal being received by said second isolating means;

second summing means including input and output means, said second summing means being connected for receiving a signal from said second output means of said third isolating means, connected for receiving a signal from said bias signal means, adapted for providing an output signal indicative of any difference in amplitude of the input signals, and connected to said control means of said third clipping means to control the amplitude of the signal being received by said third isolating means;

and third summing means including input and output means, said third summing amplifier means being connected for receiving signals from across said second output means of said second and third isolating means, connected for receiving a signal from said bias signal means, adapted for providing an output signal indicative of any difference in amplitude of the input signals, and connected to said control means of said first clipping means to control the amplitude of the signal being received by said phase shifting means.

3. In plural phase power supply means comprising, in combination:

grounding means;

variable means for supplying at least two constant amplitude alternating signals of different phases;

first regulating means including input, output and control means, said first regulating means being connected for receiving one of said two alternating signals from said supplying means;

second regulating means including input, output and control means said second regulating means being connected for receiving the other of said two alternating signals from said supplying means;

first isolating means including input means and first and second output means, said first isolation means being connected to said output means of said first regulating means for receiving an amplitude regulated signal therefrom;

second isolation means including input means and first and second output means, said second isolation means being connected to said output means of said second regulating means for receiving an amplitude regulated signal therefrom;

means connecting the first output means of each of said isolating means together and to said grounding means;

reference means;

first signal converting means including output means for supplying a first feedback signal, said first signal converting means being connected for receiving a signal from said second output means of said first isolating means;

second signal converting means including output means for supplying a second feedback signal, said second signal converting means being connected for receiving a signal from said second ouput means of said second isolating means;

first summing amplifier means including output means, said first summing amplifier means being connected for receiving siad first feedback signal from said first signal converting means, connected for receiving a signal from said reference means, adapted for supplying an output signal at said output means which is a function of the combination of said input signals, and connected to supply the combined signal to said [input] *control* means of said first regulating means to control the amplitude of the signal applied to the input means of said first isolating means;

second summing amplifier means including output means, said second summing amplifier means being connected for receiving said second feedback signal from said second signal converting means, connected for receiving a signal from said reference means, adapted for supplying an output signal at said output means which is a function of the combination of said input signals, and connected to supply the combined signal to said [input] *control* means of said second regulating means to control the amplitude of the signal applied to the input means of said second isolating means; and third summing amplifier means including output means, said third summing amplifier means being connected to said second output means of said first and second [isolative] *isolation* means for receiving a third feedback signal therefrom, connected for receiving a signal from said reference means, adapted for supplying an output signal at said output means which is a function of the combination of said input signals and connected to supply the combined signals to said variable means to control the difference in phase between said two alternating signals supplied by said variable means.

4. In power supplying means comprising, in combination:

reference potential means;

means for supplying an alternating polarity signal with respect to said reference potential means;

first diode means for clipping one polarity of the alternating polarity signal at a predetermined level, said diode means being connected between said signal supplying means and said reference potential means;

second diode means including first and second terminal means, said second diode means being adapted for clipping the other polarity of the alternating polarity signal at a level in accordance with a unidirectional signal applied to said first terminal means, said second terminal means being connected to said signal supplying means;

amplifier means including input and output means, said amplifier means being connected to said diode means to receive the resultant clipped signal therefrom at said input means;

bias signal means;

and summing means including input and output means, said summing means being connected to said output means of said amplifier means and to said bias signal means, being adapted for comparing signals received at said input means and having the output means connected to said first terminal means of said second diode means to control the clipping level thereof in accordance with a difference between the signal obtained at the output means of said amplifier means and a signal obtained from said bias signal means.

5. Three phase power supply means comprising, in combination:

source means for supplying an input signal;

first and second power amplifier means each including input means and output means;

first and second regulating means;

means connecting said source means to said first regulating means;

means connecting said first regulating means to said input means of said first power amplifier means;

first feedback means connected between said output means of said first power amplifier means and said first regulating means, said first feedback means operating through said first regulating means to regulate the amplitude of any signals supplied to said input means of said first power amplifier means;

variable phase shifting means including input means connected to said source means and also including output means;

second feedback means connected between said output means of said first and second amplifier means and said variable phase shifting means, said second feedback means operating to sense the apparatus voltage difference between any output signals appearing at said output means of said first and second amplifier means and to control the phase of any signal appearing at said output means of said variable phase shifting means as a function of the voltage difference;

means connecting said output means of said variable phase shifting means to said second regulating means;

means connecting said second regulating means to said input means of said second power amplifier means; and third feedback means connected between said output means of second power amplifier means and said second regulating means, said *third* [second] feedback means operating to regulate the amplitude of any signal supplied to said input means of said second power amplifier means.

[6. Power supply apparatus comprising, in combination:

first amplifying means including input means and first and second output means;

second amplifying means including input means and first and second output means;

signal input means for supplying an input signal;

first, second and third power output means for supplying power output signals from the power supply apparatus;

first means connecting said first power output means to said first output means of said first and second amplifying means;

second and third means connecting said second and third power output means to said second output means of said first and second power amplifying means respectively;

variable phase splitting means connecting said signal input means to said input means of said first and second amplifying means; and feedback means connected between said second and third power output means *to sense a voltage differential therebetween* and connected to said variable phase splitting means for controlling the phase of any signal supplied to said input means of said first amplifying means with respect to any signal supplied to said input means of said second amplifying means in response to deviations in the voltage sensed from a predetermined value.]

[7. Translating apparatus comprising, in combination:

first amplifying means including input means and output means;

second amplifying means including input means and second output means;

signal input means for supplying an input signal to the translating apparatus;

first, second and third means connected to said output means of said first and second amplifying means to form first, second, and third power output means for supplying two out of phase output signals from the translating apparatus;

third variable phase splitting means connecting said signal input means to said input means of said first and second amplifying means; and feedback means connected to two of said power output means to sense the voltage differential therebetween and connected to said variable phase splitting means for controlling the phase of any signal supplied to said input means of said first amplifying means with respect to any signal supplied to said input means of said second amplifying means in response to deviations in the voltage sensed from a predetermined value.]

*8. Control module apparatus for providing three phase output power signals comprising, in combination:*

*first means for supplying a first signal of a first phase;*

*amplifying means including first and second input means and providing first and second separate output signals at first and second output means thereof wherein the output means are connected together for providing;*

*first amplitude control means connected between said first means and said first input means of said amplifying means and connected to said output means of said amplifying means for receiving the second signal of the second phase therefrom, said first amplitude control means transmitting therethrough the first signal of the first phase, controlling the amplitude of the signal, and applying the amplitude controlled signal to said first input means for adjusting the amplitude of the received signal of the second phase toward a predetermined value;*

*second amplitude control means for controlling the amplitude of signals passing therethrough in response to deviations from a predetermined value of a control input signal;*

*phase control means for controlling the phase of a signal between input and output means thereof in response to a deviation from a predetermined value of a control input signal;*

*second means connecting said output means of said amplifying means to said second amplitude control means for supplying a control input signal to said second amplitude control means indicative of the amplitude of the third phase signal supplied by the amplifying means and connecting said output means of said amplifying means to said phase control means for supplying a control input signal to said phase control means indicative of the amplitude of the fourth phase signal;*

*third means connecting said second amplitude control means and said phase control means in series combination and connecting said series combination for receiving a signal of the first phase; and*

*means connecting said series combination to said second*

*input means of said amplifying means for supplying thereto a phase and amplitude regulated signal.*

*9. Power supply apparatus for supplying three-phase output power signals comprising, in combination:*

*means for supplying a first signal of a given phase;*

*amplifying means including first and second input means and first and second output means for amplifying two signals of different phases between respectively recited input means and output means;*

*means connecting said first and second output means of said amplifying means together to provide three-phase output signals;*

*first amplitude control means connected between said means for supplying a first signal and said first input means of said amplifying means and connected to said first output means for receiving a signal of a first phase therefrom, said first amplitude control means controlling the amplitude of the first signal and applying the amplitude controlled signal to said first input means of said amplifying means for adjusting the amplitude of the signal of the first phase at said first output means of said amplifying means toward a predetermined value;*

*second amplitude control means for controlling the amplitude of signals passing therethrough in response to deviations from a predetermined value of a controlled input signal;*

*phase control means for controlling the phase of a signal between input and output means thereof in response to deviations from a predetermined value of a controlled input signal;*

*means connecting said second output means of said amplifying means to said second amplitude control means for supplying a controlled signal thereto indicative of the amplitude of a second phase signal;*

*means connecting said output means of said amplifying means to said phase control means and supplying a controlled input signal thereto indicative of the magnitude of the vector sum of the first and second phases;*

*means connecting said second amplitude control means and said phase control means in a series combination and connecting said series combination for receiving a signal of the given phase; and*

*means connecting said series combination to said second input means of said amplifying means for supplying thereto a phase and amplitude regulated signal.*

References Cited

The following references, cited by the Examiner, are of record in the patented file of this patent or the original patent.

UNITED STATES PATENTS

| | | | |
|---|---|---|---|
| 2,575,600 | 11/1951 | Smith | 321—5 |
| 2,643,358 | 6/1953 | Murray | 321—5 |
| 2,853,630 | 9/1958 | Lane | 307—88.5 |
| 3,010,062 | 11/1961 | Van Emden | 321—18 |
| 3,125,726 | 3/1964 | Clifton | 307—88.5 |

JOHN F. COUCH, *Primary Examiner.*

G. GOLDBERG, *Assistant Examiner.*

UNITED STATES PATENT OFFICE

CERTIFICATE OF CORRECTION

Reissue No. 26,277 October 3, 1967

Milton W. Mathias

It is certified that error appears in the above identified patent and that said Letters Patent are hereby corrected as shown below:

Column 12, line 41, "for providing;", in italics, should read -- for providing second, third and fourth signals therefrom of second, third and fourth phases respectively; --, in italics.

Signed and sealed this 31st day of March 1970.

(SEAL)
Attest:

Edward M. Fletcher, Jr.
Attesting Officer

WILLIAM E. SCHUYLER, JR.
Commissioner of Patents